US000001884H

United States Statutory Invention Registration [19]

[11] Reg. Number: H1,884

Pruett et al.

[45] Published: Oct. 3, 2000

[54] SYSTEM AND METHOD FOR TRANSFERRING ECHO CANCELLATION DATA

[75] Inventors: James D. Pruett, Oakland; Jenny W. Erwin, Collierville, both of Tenn.

[73] Assignee: DSC/Celcore, Inc., Plano, Tex.

[21] Appl. No.: 09/026,319

[22] Filed: Feb. 19, 1998

Related U.S. Application Data

[60] Provisional application No. 60/060,107, Sep. 26, 1997, and provisional application No. 60/071,444, Jan. 12, 1998.

[51] Int. Cl.[7] ..... H04M 1/00

[52] U.S. Cl. ..... 379/399

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "Hybrid Micro Systems: The Ultimate Flexibility in Cellular Applications", 1996, pp. 1–16, Celcore, Inc., Memphis, Tennesse.

"GlobalHub Mobility Manager—Enables "One Number" PCS Service Via Motorola PPS Residential Products" pp. 1–2, Celcore, Inc., Memphis, Tennessee. 1996.

"IS–41 Network Hub—The Mobility Manager for Celcore's ClobalSystem" pp. 1–2, Celcore, Inc., Memphis, Tennessee. 1996.

"GlobalHub" pp. 1–10, Celcore, Inc., Memphis, Tennessee. 1996.

John Scourias, "Overview of the Global System for Mobile Communications", Mar. 27, 1996, pp. 1–16, John Scourias.

Martin A. Iroff & STeve Chen, "A distributed GSM Architecture for Low–Traffic Density Markets", *Mobile Communications International*, Oct. 1996, pp. 1–3, IBC Business Publishing, London, England.

Information pamplet, Feb. 1997, pp. 1–7, Version 1.0, Celcore, Inc., Memphis, Tennessee.

"BS–20/BS–21, D900/D1800 Base Transciever Station", pp. 1–2, Geschaftszweig Mobilfunknetze, Muchen, Germany. 1997.

"Unique Solutions to Complex Challenges of Wireless Carriers" pp. 1–9, Celcore, Inc., Memphis, Tennessee. 1997.

Michel Mouly and Marie–Bernadette Pautet "The GSM System for Mobile Communications", 1992, pp. 79–122, pp. 261–646, Cell & Sys. France.

Lawrence Harte, Stever Prokup, and Richard Levine "Cellular and PCS, The Big Picture", 1997, pp. 61–181, McGraw–Hill, United States of America.

George Lamb "GSM made Simple", 1997, pp. 3–158, Regal Printing, United Ststaes of America.

*Primary Examiner*—Daniel T. Pihulic
*Attorney, Agent, or Firm*—Baker & McKenzie

[57] ABSTRACT

A system for transferring echo cancellation data is provided. The system includes an echo cancellation element, which has echo cancellation algorithm data that has been determined for a predetermined telecommunications channel. The system also includes another echo cancellation element. An echo cancellation controller module is connected to the echo cancellation element and the other echo cancellation element. The echo cancellation controller module retrieves the echo cancellation algorithm data from the echo cancellation element, and transfers the echo cancellation algorithm data to the other echo cancellation element when a telecommunications channel is transferred from a cell to another cell.

23 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 5
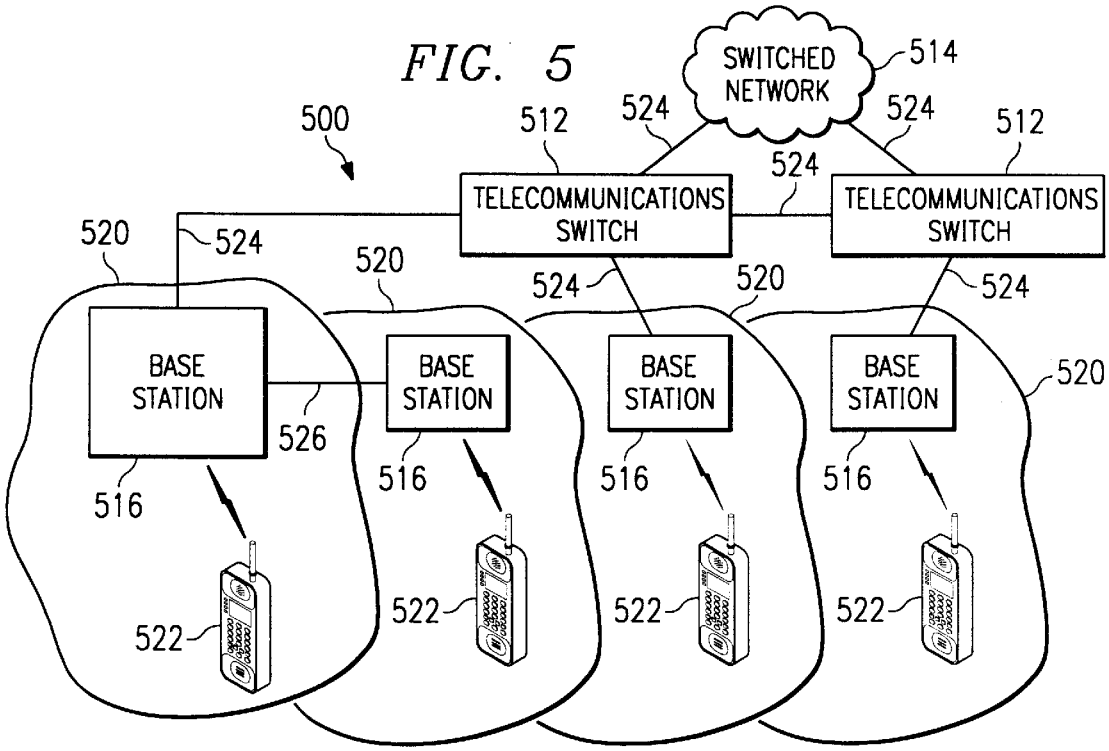
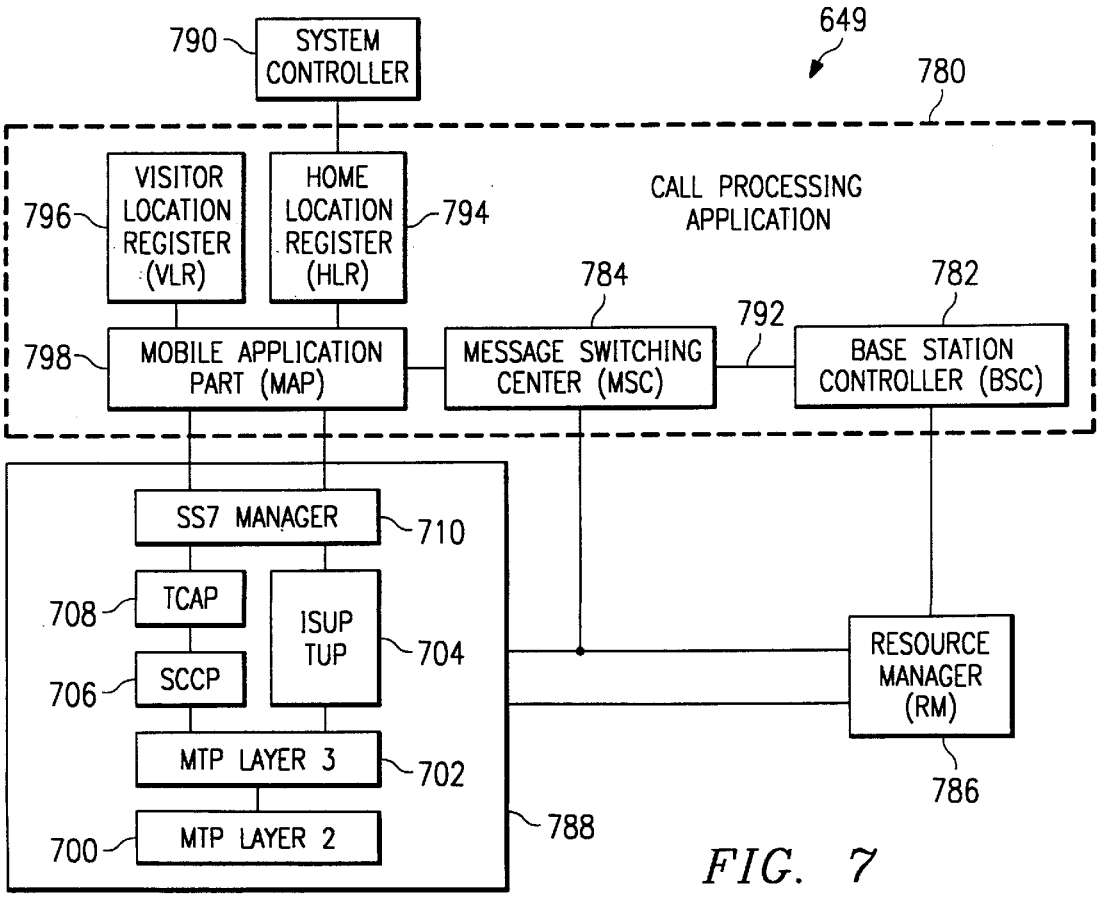
FIG. 7

SYSTEM AND METHOD FOR TRANSFERRING ECHO CANCELLATION DATA

CLAIM OF PRIORITY

The instant patent application claims priority from (a) U.S. provisional patent application No. 60/060,107, "Cellular Communication System," Anthony G. Fletcher and Scott D. Hoffpauir, inventors, filed on Sep. 26, 1997; and (b) U.S. provisional patent application No. 60/071,444, entitled "System and Method for Processing Wireless Telecommunications," James D. Pruett and Jenny W. Erwin, inventors, filed Jan. 12, 1998.

1. Related Patent Applications

The instant patent application is related to the following patent applications: (a) Ser. No. 09/025,870 "Integrated Telecommunications Switch," DSC case No. 834-00, naming Anthony G. Fletcher and Scott D. Hoffpauir as inventors, commonly owned and assigned with the present application and which is filed contemporaneously with the present application; and (b) Ser. No. 09/026,504 "Apparatus and Method for Controlling the Operational State of an Echo Canceller," DSC case No. 857-00, attorney docket No. 24194000.201, commonly owned and assigned with the present application and which is filed contemporaneously with the present application.

2. Field of the Invention

The present invention relates generally to switching systems for telecommunications, and more particularly to a system and method for transferring echo cancellation data.

BACKGROUND

Switching systems are used to provide telecommunications services between two or more user interfaces. User interfaces may include telephone handsets, facsimile machines, computers, and other equipment, and may be connected to the switching system by fixed land-based conductors or wireless services. Telecommunications services are provided by establishing a telecommunications channel between two user interfaces, such that encoded analog or digital data may be transmitted between the user interfaces until a state of completion is reached.

An undesired characteristic of telecommunications channels is the generation of echo signals. Echo signals may be inadvertently created, and are usually a function of the physical parameters of the telecommunications channel. The echo signals can disrupt voice and data communications, thus diminishing the commercial value of the telecommunications channel. Echo cancellation circuits are routinely used to prevent echo signals from degrading telecommunications channels.

Echo cancellation circuits typically use an echo cancellation algorithm that includes several variables that may be adjusted for each circuit in order to optimize the effectiveness of echo cancellation. When a wireless telecommunications user moves from a first communications cell to a second communications cell, it may be necessary to transfer the telecommunications channel from a first echo cancellation circuit to a second echo cancellation circuit. As a result of the transfer, the new echo cancellation circuit must adjust the echo cancellation algorithm variables in response to the physical parameters of the telecommunications channel. The echo cancellation algorithm variable adjustment process can result in degraded telecommunications quality and unwanted signal generation for a significant period of time, potentially causing user discomfort, loss of data, or resetting of the data channel with a corresponding loss of the call.

SUMMARY OF THE INVENTION

Therefore, a need has arisen for a system and method for processing wireless communications that reduces or eliminates the degraded telecommunications quality and unwanted noise generation that can accompany the transfer of a caller from a first cell to a second cell.

In accordance with the present invention, a system and method for processing wireless communications are provided that substantially eliminate or reduce disadvantages and problems associated with previously developed systems and methods for processing wireless communications.

One aspect of the present invention is a system for transferring echo cancellation data. The system includes an echo cancellation element, which has echo cancellation algorithm data that has been determined for a specific telecommunications channel. The system also includes another echo cancellation element. A controller is connected to the echo cancellation element and the other echo cancellation element. The controller retrieves the echo cancellation algorithm data from the echo cancellation element, and transfers the echo cancellation algorithm data to the other echo cancellation element when a telecommunications channel is transferred from a cell to another cell.

Another aspect of the present invention is a method for transferring echo cancellation data. The method includes receiving telecommunications channel data that can be used to identify a telecommunications channel, a cell, and another cell. Echo cancellation data is then obtained from an echo cancellation element associated with the cell. The echo cancellation data is then transferred to another echo cancellation element associated with the other cell.

Yet another aspect of the present invention is a method for transferring echo cancellation data in response to control data. The method includes receiving data that identifies a data channel, a cell, and another cell. An echo cancellation data transfer command is then transmitted to an echo cancellation element associated with the cell. The echo cancellation data is then transmitted to another echo cancellation element associated with the other cell.

The present invention provides many important technical advantages. One important technical advantage of the present invention is a system for processing wireless communications that allows echo cancellation algorithm variables to be transferred between echo cancellation elements. The system for processing wireless communications of the present invention thus eliminates the degraded telecommunications quality and unwanted noise generation that can accompany the transfer of a caller from a first cell to a second cell.

Another important technical advantage of the present invention is a method for processing wireless communications that determines when a telecommunications channel is going to be transferred from a first cell to a second cell and causes the echo cancellation algorithm variables to be transferred from a first echo cancellation element associated with the first cell to a second echo cancellation element associated with the second cell. The method for processing wireless communications of the present invention thus provides echo cancellation algorithm variables to a new echo cancellation element and eliminates the need for the new echo cancellation element to adjust the variables of the echo cancellation algorithm.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 5 is a block diagram of a telecommunications network in accordance with one embodiment of the present invention;

FIG. 7 more specifically illustrates certain elements and resources associated with the telecommunications switch, in accordance with an embodiment of the present invention.

DETAILED DESCRIPTION OF THE DRAWINGS

Figure 1:
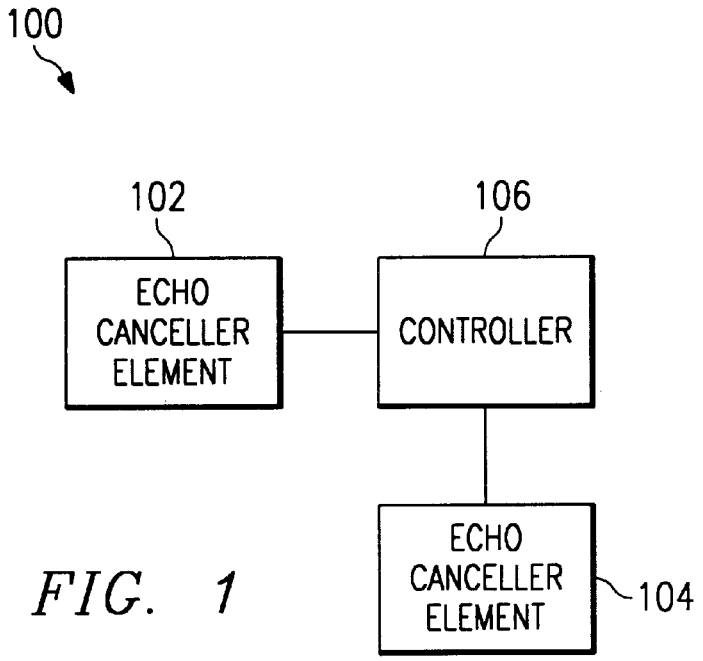
FIG. 1 is a block diagram of an echo canceller data transfer system in accordance with one embodiment of the present invention.

FIG. 1 is a block diagram of an echo canceller data transfer system 100 in accordance with one embodiment of the present invention. Echo canceller data transfer system 100 may be used in a telecommunications system that includes two or more echo canceller elements, including but not limited to a wireless telecommunications switch, a central office telecommunications switch, a hybrid interface unit, a long-distance telecommunications switch, or other suitable applications having two or more echo canceller elements. Echo canceller data transfer system 100 may be implemented in software, hardware, or a suitable combination of software and hardware.

Echo canceller data transfer system 100 includes echo canceller element 102 and echo canceller element 104, which are each connected to controller 106 by a real connection, such as a physical conductor, or by a virtual connection, such as a logical connection within a processing platform. Echo canceller element 102 and echo canceller element 104 each operate a suitable echo canceller algorithm that may be used to cancel the echo that may develop from time to time over a telecommunications channel. Echo canceller element 102 and echo canceller element 104 may each be implemented in hardware, software, or a suitable combination of hardware and software, and may utilize identical or different echo cancellation algorithms.

Controller 106 is a controller that is operable to retrieve echo canceller algorithm data from either of echo canceller element 102 and echo canceller element 104 and to transfer the echo canceller algorithm data to the other of echo canceller element 102 and echo canceller element 104. Controller 106 may be implemented in hardware, software, or a suitable combination of hardware and software. Controller 106 may be a processor that is included on a circuit card containing either of echo canceller element 102 or echo canceller element 104. Controller 106 may also be another suitable component or system controller, and may be discrete (located in a single component) or distributed (located in two or more components).

In operation, a telecommunications channel is processed by echo canceller element 102 in order to remove an echo signal from the data carried by the telecommunications channel. At a point in time, it becomes necessary to transfer the echo cancellation function for the telecommunications channel to echo canceller element 104. For example and not by way of limitation, the telecommunications channel may be associated with a roaming user, or the echo cancellation element 102 may need to be shut down for service.

If the telecommunications channel is transferred directly to be processed by echo canceller element 104, then echo canceller element 104 will need to "train" or determine the variable characteristics for the echo signal on the telecommunications channel. The training procedure results in signal distortion and a decrease in signal quality. To avoid the need to train echo canceller element 104, controller 106 is operable to receive echo canceller data from echo canceller element 102 and to transfer the echo canceller data to echo canceller element 104. In this manner, training of echo canceller element 104 is not required and the transfer of the telecommunications channel for processing by echo canceller element 104 may be accomplished without the generation of noticeable noise or signal distortion.

Controller 106 may also be configured to convert the echo canceller data in the event that echo canceller element 102 and echo canceller element 104 operate different echo cancellation algorithms. To the extent that a conversion algorithm may be determined, the conversion algorithm may be incorporated into controller 106 so as to allow the echo canceller data to be transferred.

Figure 2:
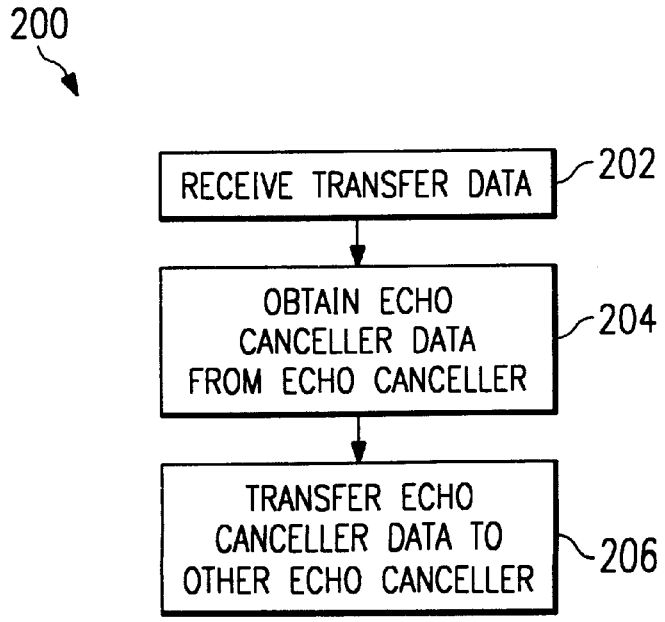
FIG. 2 is a flow chart of a method for transferring echo canceller data in accordance with one embodiment of the present invention.

FIG. 2 is a flow chart of a method 200 for transferring echo canceller data in accordance with one embodiment of the present invention. Method 200 may be used in a suitable system, such as echo canceller data transfer system 100.

Method 200 begins at step 202, where transfer data is received. The transfer data may include a control command generated by a wireless transmission system when it is determined that a wireless telecommunications services user is traveling from a cell to another cell, or other suitable data that is generated when it is necessary to transfer echo canceller algorithm data from a first echo canceller module to a second echo canceller module.

At step 204, echo canceller data is obtained from an echo canceller. The echo canceller data may include echo canceller algorithm variables that are determined after a training period, and may be automatically generated by the echo canceller element or generated in response to a control command received from the controller. The method then proceeds to step 206.

At step 206, the echo canceller data is transferred to the another echo canceller. For example, the controller may transfer the echo canceller data with control commands that cause the echo canceller data to be incorporated into suitable locations of the other echo canceller element. Alternatively, the other echo canceller element may generate a request for the echo canceller data if the system in which method 200 is implemented includes some echo canceller elements that can receive the echo canceller data and other echo canceller elements that can not receive the echo canceller data. Other suitable transfer mechanisms may be used.

Figure 3:
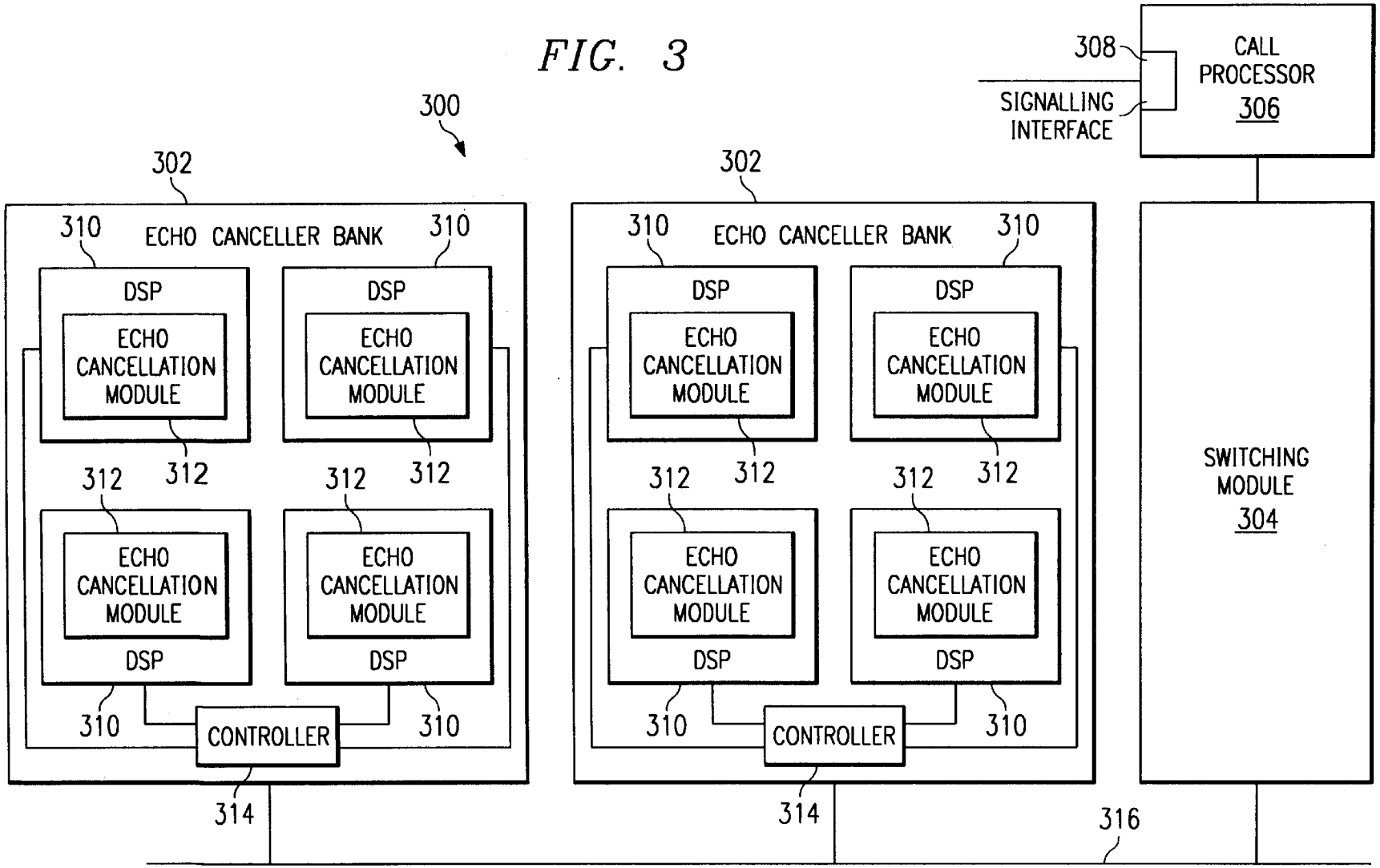
FIG. 3 is a block diagram of an echo cancellation control system in accordance with one embodiment of the present invention.

FIG. 3 is a block diagram of an echo cancellation control system 300 in accordance with one embodiment of the present invention. The echo cancellation control system 300 may be used to control the transfer of echo cancellation algorithm variables between echo cancellation elements during hand-off operations in a cellular network.

The echo cancellation control system 300 includes a switching module 304, two echo canceller banks 302 and a call processor 306. The echo canceller banks 302 are coupled to the switching module 304, which is used to transmit data to and receive data from the call processor 306.

Each echo canceller bank 302 includes four digital signal processor circuits 310 and one controller 314. The digital signal processor circuits 310 comprise suitable data processing equipment, such as a Super Harvard Architecture Computer (SHARC) digital signal processor circuit. The digital signal processor circuits 310 include an echo cancellation element 312 that is operable to perform echo cancellation data processing on telecommunications data. Echo cancellation element 312 may be implemented in software, hardware, or a suitable combination of software and hardware.

The controller 314 comprises suitable data processing equipment, such as a Motorola 80186 processor, and is coupled to each digital signal processor circuit 310. The controller 314 is operable to transfer data between the digital signal processor circuits 310, and to transfer data from the digital signal processor circuits 310 to other onboard controllers 314, or to the switching module 304.

The call processor 306 includes signaling interface modules 308. Each signaling interface module 308 is operable to receive control and signaling data from an external source, such as another switch or the public switched telephone network. Each signaling interface module 308 may receive data in an SIGNALING standard format, or may receive data in other suitable formats.

In operation, echo cancellation algorithm variables used by each echo cancellation element 312 are stored at each digital signal processor circuit 310. These echo cancellation algorithm variables are transferred to other digital signal processor circuits 310 when a caller travels from a first cell to a second cell. This occurs by a suitable process. For example, the call processor 306 may receive control information via a signaling interface module 308 or other suitable sources that indicates the present cell, in which the caller is operating, and the target cell, to which the caller is traveling. The call processor 306 then determines the echo cancellation element 312 that will be processing the signals for the target cell.

If the target echo cancellation element 312 is resident on the same echo canceller bank card 302 as the present digital signal processor circuit 310, the call processor 306 transmits control data to the controller 314 of the echo canceller bank 302 that causes the echo translation algorithm variables to be transferred from the present cell echo cancellation element 312 to the target cell echo cancellation element 312. The controller 314 for the echo canceller bank card 302 may handle all transferred data, or may transfer the data to call processor 306, if suitable.

If the telecommunications channel is being transferred from a present cell echo cancellation element 312 to a target cell echo cancellation element 312 that is resident on a second echo canceller bank card 302, the call processor 306 transmits the appropriate control commands to the controller 314 of each echo canceller bank card 302 to cause the echo cancellation algorithm variables to be transferred from the present cell echo cancellation element 312 to the target cell echo cancellation element 312 over a suitable data channel, such as a High Level Data Link Controller bus or a pulse code modulation bus. Alternatively, one or both controllers 314 may control the transfer of data.

If the target cell echo cancellation element 312 is located on another switch, the call processor 306 may retrieve the echo cancellation algorithm variable data from the present cell echo cancellation element 312, and transmit the echo cancellation algorithm variable data to the target cell call processor 306 of the target cell switch via the signaling interface module 308. In this configuration, a caller is traveling from a present cell that is controlled by a telecommunications switch containing the call processor 306, and is traveling into a target cell controlled by a different telecommunications switch.

In summary, the echo cancellation algorithm variable data is transferred from the echo cancellation element on which the call is presently being processed to an echo cancellation element that will process the call when it is transferred. This eliminates the need for the echo cancellation element of the target cell to determine the echo cancellation algorithm variable data using a process that can generate unwanted noise and degrade signal quality.

Figure 4:
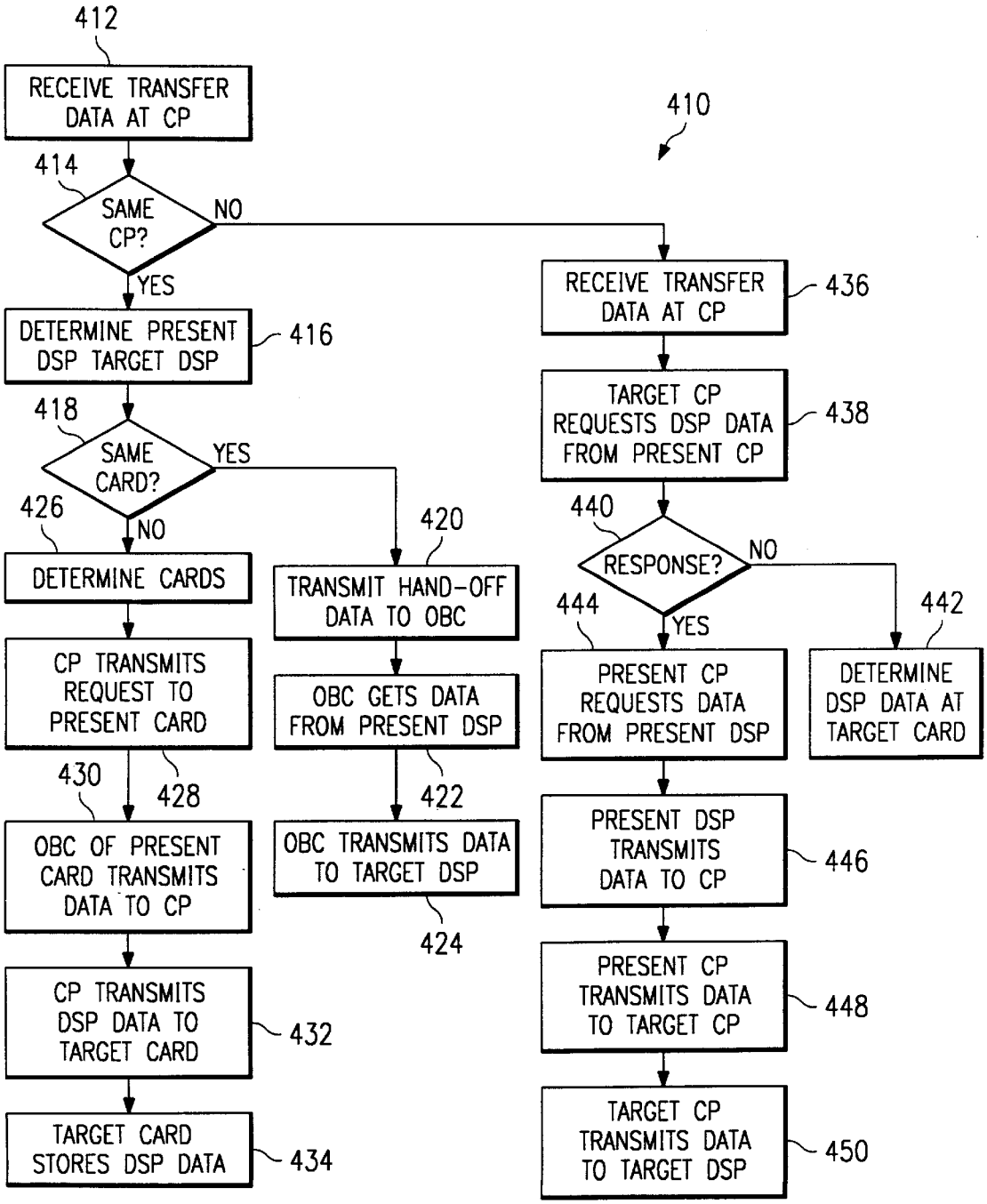
FIG. 4 is a flow chart of a method for transferring echo cancellation algorithm data in accordance with one embodiment of the present invention.

FIG. 4 is a flow chart of a method 410 for transferring echo cancellation algorithm data in accordance with one embodiment of the present invention. Method 410 may be used in a switch that utilizes two or more separate echo cancellation elements. Method 410 may also be used in a system that comprises two or more switches.

Method 410 begins at step 412 where transfer data is received at a call processor. For example, this transfer data may include signal strength data received from one or more base station controllers that indicates that a caller is moving from a present cell to a target cell. The method then proceeds to step 414, where the call processor determines whether the present cell and the target cell are both controlled by the same call processor.

For example, the call processor may receive suitable data from another call processor that indicates that the target cell is controlled by that call processor. Alternatively, the transfer data may include data that identifies the physical location of, or the call processor that controls, the target cell and present cell. If the present cell and the target cell are both controlled by the same call processor, the method proceeds to step 416, otherwise the method proceeds to step 436.

At step 416, the circuit card location of the present echo cancellation element and the target echo cancellation element are determined. The present and target echo cancellation elements may comprise one or more digital signal processor circuits on a single card or on separate cards. The method then proceeds to step 418, where it is determined whether the present echo cancellation element and the target echo cancellation element are on the same circuit card.

If the present echo cancellation element and the target echo cancellation element are on the same circuit card, the method proceeds to step 420, where the hand-off data is transmitted to the onboard controller for the circuit card on which the present echo cancellation element and the target echo cancellation element are resident. The present echo cancellation element and the target echo cancellation element may be physically installed on the same card, or may be installed on daughterboards that may be added to or removed from the circuit card to improve circuit flexibility.

At step 422, the present onboard controller retrieves the echo cancellation algorithm variable data from the present echo cancellation element. This echo cancellation algorithm variable data may be stored at predetermined memory locations of a digital signal processor circuit, or on other suitable devices. The method then proceeds to step 424, where the onboard controller stores the echo cancellation algorithm variable data on memory devices of the target echo cancellation element, such as predetermined memory locations of a digital signal processor circuit.

If the present echo cancellation element and the target echo cancellation element are not on the same circuit card, the method proceeds to step 426, where the address of the present card and the target card is determined, such as from a lookup table. The method then proceeds to step 428, where the call processor transmits a request for the echo cancellation algorithm variable data to the onboard controller for the circuit card on which the present echo cancellation element is resident. The method then proceeds to step 430.

At step 430, the present onboard controller retrieves the echo cancellation algorithm variable data from predetermined memory locations and transmits the data to the call processor. The call processor then transmits the echo cancellation algorithm variable data to the onboard controller of the target circuit card at step 432. The target onboard controller stores the echo cancellation algorithm variable data at suitable memory locations at step 434, such as in memory devices of a digital signal processor circuit.

If the present cell and the target cell are not both controlled by the same call processor, the method proceeds to step 436. At step 436, the target call processor receives the transfer data, such as data from a base station controller that indicates that a presently nonresident caller is about to enter a cell controlled by the call processor. The method then proceeds to step 438, where the target call processor requests echo cancellation algorithm variable data from the present call processor. This request may be transferred over a suitable signaling channel, such as an SS7 signaling data channel, or by other suitable means, such as a dedicated signaling channel between call processors.

At step 440, it is determined whether a response has been received from the present call processor. If the caller is moving rapidly into the target cell, or if the present call processor is not configured to transfer echo cancellation algorithm variable data, then a response may not be received in a timely manner. If no response is received within a predetermined period of time, the method proceeds to step 442, and the echo cancellation algorithm variable data is determined by a predetermined process by the target echo cancellation element. Otherwise, the method proceeds to step 444.

At step 444, the present call processor requests data from the present echo cancellation element. This data may be stored at predetermined memory locations of a digital signal processor circuit. The onboard controller of the circuit card on which the echo cancellation element is resident may also interface with the echo cancellation element and the call processor to retrieve the echo cancellation algorithm variable data.

At step 446, the echo cancellation algorithm variable data is transmitted from the present echo cancellation element to the present call processor. The present call processor transmits the echo cancellation algorithm variable data to the target call processor over a suitable signaling channel or control data channel at step 448. At step 450, the target call processor stores the echo cancellation algorithm variable data at a predetermined memory location for the target echo cancellation element.

FIG. 5 is a block diagram of a telecommunications network 500 embodying concepts of the present invention. The telecommunications network 500 is a general telecommunications system that may be used to provide telecommunications services to users, without requiring the users to access land based telecommunications interfaces, such as telephone handsets. Telecommunications network 500 may be a Public Land Mobile Network (PLMN).

The telecommunications network 500 includes one or more telecommunications switches 512. The telecommunications switch 512 is a self-contained telecommunications system, and may be coupled to other telecommunications switches 512. The telecommunications switch 512 is typically coupled to a switched network 514, such as the public switched telephone network.

The telecommunications switch 512 may be coupled to one or more base stations 516, and may be configured to control the operation of any base stations 516 that are coupled directly to the telecommunications switch 512. The base station 516 is used to control wireless telecommunications traffic in a service area or cell 520. Subscriber units 522 are used in conjunction with the base stations 516 and the telecommunications switches 512 to communicate with other subscriber units 522 or with the switched network 514.

The telecommunications switch 512 may be coupled to other telecommunications switches 512, the switched network 514, and to base stations 516 by a suitable transmission link 524, such as an E1 telecommunications line. Similarly, a base station 516 may be coupled to another base station 516 by a suitable transmission link 526. An E1 telecommunications line carries 2.048 megabits of data per second in a standard data format. This standard data format is organized as 30 digitally-encoded telecommunications channels carrying 64,000 bits per second for voice or data applications. In addition, the standard data format includes a single 64,000 bit per second data channel for signaling data, and a single 64,000 bit per second channel for framing, synchronization, maintenance, and control purposes. The base stations 516 may also transfer data to the telecommunications switches 512 in a Link Access Protocol on the D Channel (LAP-D) data format.

In operation, a user attempts to establish a telecommunication channel using a subscriber unit 522. The user, located in a cell 520, activates a subscriber unit 522, which transmits a service request to a base station 516 using radio frequency electromagnetic radiation. This radio frequency electromagnetic radiation includes encoded data in a suitable data transmission format, such as time division multiple access or code division multiple access. The base station 516 transmits the service request to the telecommunications switch 512. The telecommunications switch 512 then determines the destination of the service request and establishes a telecommunications channel.

For example, if the destination is another subscriber unit 522 that is serviced by the telecommunications switch 512 processing the service request, the telecommunications switch 512 will transmit control and signaling data to the appropriate base station 516. This control and signaling data will be used to notify the user of the subscriber unit 522 that an incoming call is being attempted. Alternatively, the telecommunications switch 512 may transmit control and signaling data to another telecommunications switch 512, which will then transmit appropriate control and signaling data to a base station 516 for communication with a subscriber unit 522 that is serviced by that other telecommunications switch 512.

If the user at the subscriber unit 522 transmits a request for service to the switched network 514, the telecommunications switch 512 will transmit appropriate signaling and control data to the switched network 514. In addition, the telecommunications switch 512 will receive signaling and control data from the switched network 514 that indicate whether a telecommunications channel has been successfully established. After the telecommunications channel is established, the telecommunications switch 512 performs operation, administration, maintenance, and provisioning functions to maintain the telecommunications channel until the call is completed. The telecommunications switch 512 then de-allocates the call resources.

Figure 6:
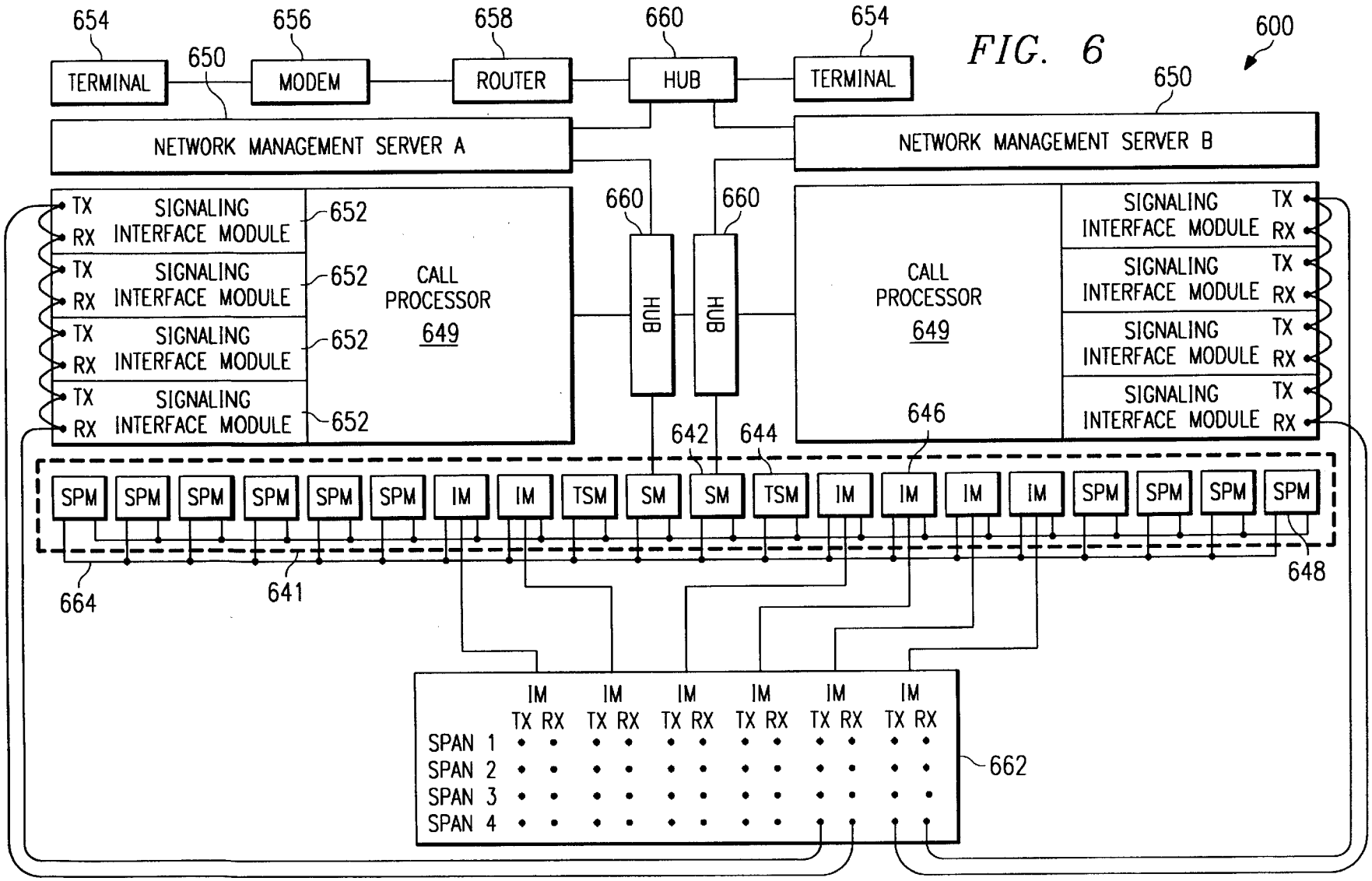
FIG. 6 is a block diagram of a telecommunications switch in accordance with one embodiment of the present invention.

FIG. 6 is a block diagram of a telecommunications switch 600. The telecommunications switch 600 includes multiple resource modules 641 that provide the other elements and components of the telecommunications switch 600 with suitable resources such as switching, rate adaption, transcoding.

The telecommunications switch 600 preferably includes one or more switching modules 642. The switching module 642 may be implemented in software, hardware, or a suitable combination of software and hardware. For example, the switching module 642 may comprise suitable digital data processing devices, such as a switching matrix, a processor (for example a Motorola 68360 telecommunications processor), random access memory, and other devices. The switching module 642 runs a suitable operating system such as pSOS+.

The switching module 642 may also include one or more pulse code modulation bus interfaces, one or more control bus interfaces such as High Level Data Link Controller (HDLC) control bus interfaces, one or more Ethernet interfaces, and an arbitration bus interface to other switching modules 642. The switching module 642 is coupled to a suitable data link 664, such as one or more control buses such as High Level Data Link Control buses and one or more pulse code modulation buses.

The switching module 642 performs switching operations, clock operations, and local communications between the resource assembly components (the switching modules 642, the telephony support modules 644, the interface modules 646, and the signal processing modules 648) of the telecommunications switch 600. These functions may be performed using pulse code modulation switching and data transfer techniques, Link Access Protocol on the D Channel communications, and Ethernet interface communications.

The telecommunications switch 600 also preferably includes one or more telephony support modules 644. The telephony support module 644 may be implemented in software, hardware, or a suitable combination of software and hardware. For example, the telephony support module 644 may comprise suitable telecommunications data processing equipment, such as a processor (for example, an Intel 80186 processor), random access memory, one or more redundant High Level Data Link Controller bus interfaces, one or more pulse code modulation buses, and an arbitration bus for establishing active telephony support module 644 status. The telephony support module 644 is coupled to a suitable data link 664, such as one or more High Level Data Link Control buses and one or more pulse code modulation buses.

The telephony support module 644 may be used to provide tone generation, R2 digit transceiver functions, and digitized announcement generation for telecommunications switch 600. The telephony support module 644 may also provide call setup functions, such as digit collection and out-pulsing, and call completion functions, such as digitized announcement generation and call supervisory tone generation. A single telephony support module 644 provides the required functionality for the telecommunications switch 600. One or more additional telephony support modules 644 are used to provide redundancy in the event of component failure.

The telecommunications switch 600 also preferably includes one or more interface modules 646. The interface module 646 is an interface device that is used to interface a suitable number of telecommunications lines that carry data in a predetermined format, such as an E1 data format, with the telecommunications switch 600. The interface module 646 may be implemented in software, hardware, or a suitable combination of software and hardware. For example, the interface module 646 may comprise suitable data processing equipment, such as a processor (for example an Intel 80186 processor), random access memory, up to four E1 ports, redundant High Level Data Link Controller bus interfaces, and pulse code modulation bus interfaces.

The interface modules 646 provide the physical interface between the telecommunications switch 600 and other switches, the switched network, and base stations. The interface modules 646 also support in-band trunk signaling for data channels that are configured for channel associated signaling, and transmit data to and receive data from the signaling interface modules 652.

The interface module 646 is coupled to a suitable data link 664, such as one or more High Level Data Link Control buses and one or more pulse code modulation buses. The interface module 646 is also coupled to an interface module interface 662, which is used to connect the interface module 646 to external data links such as one or more transmission links. Each external data link typically includes a transmit lead and a receive lead.

The telecommunications switch 600 also preferably includes one or more signal processing modules 648. The signal processing module 648 may be implemented in software, hardware, or a suitable combination of software and hardware. For example, the signal processing module 648 may comprise suitable data processing equipment, such as a processor (for example an Intel 80186 processor), random access memory, one or more Super Harvard Architecture Computer (SHARC) digital signal processor circuits, four daughter board module ports, redundant High Level Data Link Controller buses, pulse code modulation matrix bus interfaces, and other signal processing application hardware.

The signal processing module 648 may be used to perform transcoding and rate adaption (TRAU) functions, such as converting from a wireless system speech encoding format to a pulse code modulation data format. For example, the telecommunications switch 600 may be used to provide switching services in a wireless telecommunications system that uses Groupe Speciale Mobile (GSM) format data. Signal processing module converts data from the GSM data format to an appropriate format, such as the pulse code modulation data format. Digital signal processor daughterboards may be used to allow the capacity of calls handled by the signal processing module 648 to be increased or decreased, as appropriate to support system requirements.

The telephony support modules 644, the interface modules 646, and the signal processing modules 648 are preferably coupled through switching modules 642 and hub switches 660 to redundant call processor systems 649. The call processor system 649 is operable to control the function of components of the telecommunications switch 600.

The call processor system 649 is a general purpose computing platform, such as a Pentium II based computing platform, that includes suitable hardware and software systems to support telecommunications processing. The call processor system 649 may use a real-time operating system such as QNX™ to support the real-time call processing requirements of switch 600.

The call processor 649 preferably includes one or more systems that allow it to perform the functions of a base station controller system and a message switching center system. In addition, the call processor 649 provides other elements that take part in processing calls directed to, or initiated by, the subscriber units. Specifically, the call processor 649 includes a call processing application that provides various call processing and signaling functions, such as call origination and termination functions, as well as location updating and handover of mobile subscribers.

For example, the call processing application may provide GSM call processing functions and include a visitor location register system, a home location register system, a mobile application part system, a base station subscriber system, a mobile switching center system, an SS7 signaling system, and other suitable systems. An example of a GSM call processing application that may be used to provide the functionality of call processor 649 is provided by the U.S. patent application entitled "Integrated Telecommunications Switch," DSC case No. 834-00, Ser. No. 09/025,870, naming Anthony G. Fletcher and Scott D. Hoffpauir as inventors, commonly owned and assigned with the present application, filed contemporaneously with the present application, and which is hereby incorporated by reference for all purposes.

The call processor 649 is coupled to a primary and a secondary network management server 650. The primary and secondary network management servers 650 are redundant network management systems servers that provide operation, administration, maintenance, and other functions for the components of the telecommunications switch 600. The network management servers 650 incorporate the functionality of both an Operations Maintenance Center - Radio (OMC-R) and an Operations Maintenance Center - Switching (OMC-S).

The signaling interface modules 652 are coupled to the call processors 649 and the interface modules 646. The signaling interface modules 652 are used to provide an interface between the call processors 649 and a signaling system, such as one that transmits data in a signaling system seven (SS7) data format. For example, data in an SS7 data format may be received from a transmission link 24 from the public switched telecommunications network or other switches, and may be switched to a transmission link, such as an E1 telecommunications channel, from interface modules 646 to signaling interface modules 652 by switching modules 642.

The terminals 654 are coupled to the primary and secondary network management servers 650 either directly or through a modem 656, a router 658, and hub switch 60. The terminals 654 are used to interface with the primary and secondary network management servers 650. The terminals 654 and the primary and secondary network management servers 650 comprise a network management system that allows a user to remotely monitor and manage telecommunications switch 600.

In operation, a telecommunications channel is processed by telecommunications switch 600. If an echo signal is present, then an echo canceller element of the signal processing modules 648 is used to cancel the echo signal. If a wireless user associated with the telecommunications channel roams to a different cell serviced by telecommunications switch 600, then the telecommunications channel may be transferred to an echo canceller element of a signal processing module 648 associated with that cell. The call processor system 649, the switching module 642, and the controller of signal processing module 648 are used to transfer echo canceller algorithm variables from the echo canceller element of the present cell to the echo canceller element of the target cell. In this manner, it is not necessary for the variables of the echo canceller algorithm of the echo canceller element of the target cell to be modified, other than to be offset for the additional number of frames of delay introduced by the transfer and additional transmission channel path length.

FIG. 7 more specifically illustrates certain elements and resources associated with the telecommunications switch 600, in accordance with an embodiment of the present invention.

The call processor 649 preferably includes a call processing application 780 that includes, among other things, a base station controller 782 and a message switching center 784. In addition, the call processor 649 preferably includes several other elements, namely, a resource manager 786, an SS7 element 788 and a system controller 790.

The base station controller 782 is responsible for management of the radio interface associated with each base station, including the allocation and release of radio channels associated with a given radio interface, and management of handovers from one base station to another base station. The base station controller 782 manages the radio transmission equipment associated with the base station(s) and is responsible for management of the radio interfaces through the allocation, release, and handover of radio transmission channels.

The base station controller 782 interfaces with the resource assembly 41 for management of the traffic channels and transcoders as well as for access to the telecommunication switch 600. The base station controller 782 interfaces with the network management server 650 for fault, configuration, and performance management of both the base station controller 782 and the base station(s).

The base station controller 782 carries out various procedures that relate to call connection tasks. Some of those procedures include: system information broadcasting; subscriber paging; immediate traffic channel assignment; subsequent traffic channel assignment; call handover; radio connection and release; connection failure detection and reporting; and power capability indication reporting.

The message switching center 784 is primarily responsible for mobility management, call control and trunking, such as coordinating the setting-up and termination of calls to and from subscriber units. Additionally, it provides all of the functionality needed to handle mobile subscribers through location updating, handover, and call delivery.

The message switching center 784 interfaces with the resource assembly for, among other things, trunk management, tone generation, digit collection and switching. It interfaces with the network management server 650 for fault management, configuration management, performance management and accounting management.

As discussed more fully below, the base station controller 782 and the message switching center 784 are preferably implemented in software that is associated with one or more processors. Such implementation is preferable since, among other reasons, software is presently more readily modified to reflect desired changes in the base station controller 782 and/or message switching center 784. It is, however, readily appreciable that such elements may be implemented in numerous other ways within the scope of the present invention. For example, the base station controller 782 or the message switching center 784 can be implemented within one or more integrated circuits within the scope of the present invention.

The interface between the base station controller 782 and the message switching center 784 is commonly known as the A interface 792. The A interface 792 provides the link for managing traffic channels/transcoders, and also provides the MSC with access to an Abis interface for message flow with the mobile stations. The BSSMAP protocol is used for transmitting connection-related requests and paging requests between the message switching center 784 and base station controller 782. Preferably, the base station controller 782 and the message switching center 784 are implemented as distinct entities, such as separate software objects that communicate with one another, so that the A interface 792 is logically discernible.

Management and allocation of resources provided by the resource assembly with respect to the call processor 649 is carried out by the resource manager 786. That is, the resource manager 786 acts as the bridge between the call processing application 780 and the resource assembly by enabling different elements of the call processing application 80 to interface with resources of the resource assembly 641. Preferably, the resource manager 786 also provides an interface to the signaling interface modules 652 for the SS7 element 788 as well as remote elements, such as the system controller 790 and various elements of the network management system 650.

The resource manager 786 is preferably implemented in software, and achieves the management and allocation of resources by employing object request broker technology. More specifically, the resource manager 786 provides a proxy object for each element or application outside the resource manager 786 which may seek to interface with the resource manager 786. Similarly, each such object or application is provided with a counterpart proxy object. An interface is defined between each proxy object of the resource manager 786 and the element or application to which it corresponds, as well as between each counterpart proxy object and the resource manager 786.

An interface can be defined using Interface Definition Language or IDL, which establishes acceptable messages and responses that can be exchanged over the defined interface. When a particular element or resource desires to interface with a resource of the resource assembly 641 or the signaling interface modules 652, a message is sent from that element or application to the counterpart proxy object of that element or application. That counterpart proxy object then, in turn, forwards the request to the resource manager 786 in conformance with the defined interface. Similarly, when the resource manager 786 interfaces with a particular element or application (for example, the call processing application 780) with respect to a resource of the resource assembly 641 or the signaling interface modules 652, a message is sent to the proxy object of the resource manager 786 corresponding to the particular element or application. That proxy object then, in turn, forwards the request to the particular element or application in conformance with the defined interface.

The SS7 element 788 provides the logic needed to provide SS7 signaling functionality for SS7 connectivity to the switched network 614. It is responsible for performing various functions and user interfaces associated with the various parts and protocols that are included within SS7 signals. For example, the SS7 element 788 receives SS7 data from the resource manager that has been transmitted to the signaling interface modules 652 from the interface modules 646, and transforms the data as required to support the call processing application 780.

Likewise, the SS7 element 788 receives data from the call processing application 780 and transforms the data as required for transmission in accordance with the SS7 signaling protocol. This transformed data is then provided to the resource manager 786 for transmission to the signaling interface modules 652 and subsequent transmission to the telecommunication switches 600 and the switched network.

The system controller 790 is responsible for ensuring that the call processor 649 is operating properly by periodically testing elements of the call processor 649. A successful test of an element of the call processor 649 may comprise, for example, observing a predetermined response from the element after sending a predetermined message to the element. This is sometimes referred to as "pinging" an element.

The call processing application 788 includes a visitor location register 796 (sometimes abbreviated as VLR), a home location register 794 (sometimes abbreviated as HLR), and a mobile application part 798 (sometimes abbreviated as MAP). Both the HLR 794 and the VLR 796 provide a database function for subscriber related information. Such subscriber related information includes subscription information for such subscribers, such as the service options to be provided to each subscriber (for example, voice mail, call waiting, etc.), preferences and option selections supplied by the subscribers (for example, voice mail prompts), and the location of those subscribers. The HLR 794 provides that database function for certain set of subscribers, namely, those subscribers enrolled for service with the operator of the telecommunications switch 649 or otherwise associated with the telecommunications switch 649. In contrast, the VLR 796 provides a database function for those subscribers known to be situated in the area serviced by the telecommunications switch 649 and its associated base station(s). Those subscribers would therefore include roaming subscribers, i.e., subscribers associated with another operator or telecommunications switch for which subscriber related information is maintained externally but not in the HLR 794 of the telecommunications switch 649. To obtain subscriber related information about a roaming subscriber, the VLR 796 of a telecommunications switch 649 would therefore have to access the HLR of another operator or telecommunications switch. Such access would, in turn, provide that external HLR with knowledge of the location of the roaming subscriber.

It should be appreciated that although conventional systems typically integrates functions associated with the MSC 784 and the VLR 796, it is preferable to form distinct elements for those functions.

SS7 signaling is provided to the telecommunications switch 649 as a transport mechanism for MAP dialogues and out-of-band signaling with other switches. That signaling includes several parts, each having a distinct protocol. Specifically, SS7 signals include: (a) a lower layer Message Transfer Part (sometimes abbreviated as MTP), which applies to call related or non-call related signaling; (b) a Signaling Connection Control Part (sometimes abbreviated as SCCP) and a Transaction Capabilities Application Part (sometimes abbreviated as TCAP), which apply only to call related signaling and (c) TUP and ISUP, which apply only to non-call related signaling.

The SS7 component 788 includes an element that corresponds with the aforementioned parts, namely, a MTP Layer 2 element 700, a MTP Layer 3 element 702, and ISUP/TUP element 704, an SCCP element 706 and a TCAP element 708. Through these elements, the SS7 component 788 provides functionality related to each of those elements 700–708, including ISUP roaming, Global Title translations, and terrestrial and satellite links.

The SS7 manger element 710 provides for management and cooperation with respect to the other elements of the SS7 component and other elements of the call processor assembly 649, such as the resource manager 786, the MAP 798 and the MSC 784.

The MAP element 798 is the logical link between the VLR 796 and HLR 794. As such, it is directly associated with the VLR 796 and the HLR 794 and provides the dialogues through which they communications with each other and with other elements. The MAP 798 provides a protocol based on the services provided by the SS7 element 788 for non-call related signaling (specifically, TCAP) for use by other elements. The specific nature of the protocol provided by the MAP 798 is dependent on the identity of such elements, which is sometimes referred to as the MAP protocol interface. For example, messages between the VLR 796 and an external HLR utilize one MAP protocol interface while messages between the VLR 796 and an external VLR utilize another MAP protocol interface. Preferably, an authentication element is integrated within the HLR 794 to provide authentication information to the HLR 794 for validating subscribers requesting service from the telecommunication system 600.

In operation, a telecommunications channel is established between a subscriber unit and another telecommunications node, such as another subscriber unit or a user that is connected to the switched network (it should be noted that echo cancellation may not be required for calls between mobile units in a GSM system). When the subscriber unit roams from a first cell to another cell, the call-specific echo cancellation algorithm variables are transferred from a first echo cancellation element, associated with the present cell, to a second echo cancellation element, associated with the target cell, by the call processor 649. Additional data may also be transmitted with the echo cancellation algorithm variables, such as information relating to the number of frames of signal delay for transmission of the signal to the echo cancellation element.

Call processor 649 may accomplish the transfer by transmitting suitable control commands to an on-board controller of a circuit card that includes the two echo cancellation elements, or by transferring the echo cancellation algorithm variables from the echo cancellation element to another call processor 649, which receives the echo cancellation algorithm variables and causes them to be stored at the appropriate echo cancellation element associated with that other call processor 649.

For example, the echo canceller may generate an estimate of the echo signal that is represented by the summation from k =0 to N−1 of a(k)*y(i−k), where:

$$a(k)=a(k)+2*G*u(i)*y(i-k)$$

and a(k)=transversal filter coefficients u(i)=filtered signal y(i−k)=predetermined reference samples G=gain value for control of the speed of the adaptation process.

In this example, the transversal filter coefficients might be transferred to the echo cancellation element for the target communications cell.

The transfer of call-specific echo cancellation algorithm variables allows the call to be transferred or handed off to another cell without requiring the echo cancellation element associated with that cell to reestablish the variable values for the telecommunications channel. In this manner, the user is not subjected to the degraded telecommunications quality and unwanted noise generation that can accompany the transfer of a caller from a first cell to a second cell.

In operation, a caller travels from a first cell to a second cell of a wireless telecommunications system while transferring data over an established telecommunications channel. As the caller approaches the cell boundaries, the base station controllers or call processor(s) determine that the caller is about to roam from the present cell to the target cell. Prior to the transfer, the echo cancellation element data that has been previously determined for the telecommunications channel is transferred from a first echo cancellation element of the present cell to a second echo cancellation element of the target cell in order to avoid the degraded telecommunications quality that may result if the target echo cancellation element is required to determine the call-specific echo cancellation algorithm variable data.

The method of the present invention may be used when both echo cancellation elements are resident on the same circuit card, on different circuit cards that are controlled by the same call processor, or on different circuit cards that are controlled by different call processors.

Although several embodiments of the present invention and its advantages have been described in detail, it should be understood that changes, substitutions, transformations, modifications, variations, and alterations may be made therein without departing from the teachings of the present invention, the spirit and the scope of the invention being set forth by the appended claims.

What is claimed is:

1. A system for transferring echo cancellation data comprising:

an echo cancellation element having echo cancellation algorithm data;

another echo cancellation element; and a controller coupled to the echo cancellation element and the other echo cancellation element, the controller operable to retrieve the echo cancellation algorithm data from the echo cancellation element and to transfer the echo cancellation algorithm data to the other echo cancellation element when a telecommunications channel is transferred from a cell to another cell.

2. The system of claim 1 wherein the echo cancellation element and the other echo cancellation element are digital signal processor circuits.

3. The system of claim 1 wherein the echo cancellation element and the other echo cancellation element are each resident on a single circuit card.

4. The system of claim 1 wherein the echo cancellation element is resident on a circuit card, the other echo cancellation element is resident on another circuit card, and the controller is operable to transfer the echo cancellation algorithm data from the circuit card to the other circuit card.

5. The system of claim 1 wherein the controller further comprises:

a switching module coupled to each echo cancellation element; and a call processor coupled to the switching module, where the call processor is operable to receive data from a cell system and another cell system that indicates that a caller is moving from the cell system to the other cell system, to transmit a command to the echo cancellation element through the switching module requesting the echo cancellation data, to receive the echo cancellation data from the echo cancellation element through the switching module, and to transmit the echo cancellation data to the other echo cancellation element through the switching module.

6. The system of claim 1 wherein the controller further comprises:

a signal processing circuit card, where the echo cancellation element is resident on the signal processing circuit card;

another signal processing circuit card, where the other echo cancellation element is resident on the other signal processing circuit card;

a switching module coupled to the signal processing circuit card and the other signal processing circuit card; and a call processor coupled to the switching module, where the call processor is operable to receive data from a cell system and another cell system that indicates that a caller is moving from the cell system to the other cell system, to transmit a command to the signal processing circuit card through the switching module requesting the echo cancellation data, to receive the echo cancellation data from the signal processing circuit card through the switching module, and to transmit the echo cancellation data to the other signal processing circuit card through the switching module.

7. The system of claim 1 further comprising:

an interface module coupled to the controller and a control data network;

another controller having another interface module, the other interface module coupled to the other controller, the other echo cancellation element, and the control data network; and wherein the controller is coupled to the other echo cancellation element through the control data network and the other controller, and the controller is operable to receive the echo cancellation data from the echo cancellation element and to transmit the echo cancellation data to the other controller.

8. The system of claim 7 wherein the echo cancellation element and the other echo cancellation element are digital signal processor circuits.

9. The system of claim 7 wherein the control data network is an SS7 signaling network.

10. A method for transferring echo cancellation data comprising:

receiving telecommunications channel data that can be used to identify a telecommunications channel, a cell, and another cell;

obtaining echo cancellation data from an echo cancellation element associated with the cell; and transferring the echo cancellation data to another echo cancellation element associated with the other cell.

11. The method of claim 10 wherein receiving telecommunications channel data that identifies a telecommunications channel, a cell, and another cell comprises:

receiving data that identifies the cell where a subscriber is presently operating;

receiving data that identifies the other cell where the subscriber will be operating within a predetermined period of time; and compiling the request for echo cancellation data in response to the data.

12. The method of claim 10 further comprising transmitting a request for echo cancellation data to the echo cancellation element associated with the cell.

13. The method of claim 10 further comprising transmitting a request to a circuit card having one or more digital signal processor circuit(s).

14. The method of claim 10 wherein receiving the echo cancellation data from the echo cancellation element comprises receiving echo cancellation algorithm variable data for an established telecommunications channel from the echo cancellation element.

15. The method of claim 10 wherein receiving the echo cancellation data from the echo cancellation element comprises receiving transversal filter coefficients for an established telecommunications channel from the echo cancellation element.

16. The method of claim 10 wherein transmitting the echo cancellation data to another echo cancellation element associated with the other cell comprises transmitting the echo cancellation data to a signal processing circuit card.

17. The method of claim 10 wherein transmitting the echo cancellation data to another echo cancellation element associated with the other cell comprises transmitting the echo cancellation data to a signal processing circuit card that further comprises one or more digital signal processing circuits.

18. The method of claim 10 wherein transmitting a request for echo cancellation data to an echo cancellation element associated with the cell comprises:

transmitting the request for echo cancellation data to a switching module; and transmitting the request for echo cancellation data from the switching module to the echo cancellation element.

19. The method of claim 10 wherein transmitting the echo cancellation data to another echo cancellation element associated with the other cell comprises:

transmitting the echo cancellation data to a switching module; and transmitting the echo cancellation data from the switching module to the other echo cancellation element.

20. A method for transferring echo cancellation data comprising:

receiving data that identifies a data channel, a cell, and another cell;

transmitting an echo cancellation data transfer command to an echo cancellation element associated with the cell; and transmitting the echo cancellation data to another echo cancellation element associated with the other cell.

21. The method of claim 20 wherein the echo cancellation element and the other echo cancellation element are located on a single echo cancellation element card.

22. The method of claim 20 wherein the echo cancellation element is located on an echo cancellation element card and the other echo cancellation element is located on another echo cancellation element card.

23. The method of claim 20 wherein the echo cancellation element is located on an echo cancellation element card associated with a wireless telecommunications system and the other echo cancellation element is located on another echo cancellation element card associated with another wireless telecommunications system.

* * * * *